United States Patent [19]

Brolin et al.

[11] 4,087,646
[45] May 2, 1978

[54] DUAL MODE TELEPHONE SUBSCRIBER LOOP CURRENT DETECTOR

[75] Inventors: Stephen Joseph Brolin, Livingston; Richard Joseph Lisco, Whippany; Mark Thomas Manfred, Rockaway, all of N.J.

[73] Assignee: Bell Telephone Laboratories, Incorporated, Murray Hill, N.J.

[21] Appl. No.: 763,288

[22] Filed: Jan. 28, 1977

[51] Int. Cl.² .......................... H04Q 9/00; H04M 3/00
[52] U.S. Cl. ............................. 179/18 FA; 179/84 R; 179/18 HB
[58] Field of Search ........... 179/18 FA, 18 F, 18 HB, 179/84 R, 84 A; 328/164

[56] References Cited

U.S. PATENT DOCUMENTS

| | | | |
|---|---|---|---|
| 3,205,312 | 9/1965 | Brightman et al. | 179/18 F |
| 3,899,644 | 8/1975 | Hunt | 179/84 R |
| 3,935,392 | 1/1976 | Smith et al. | 179/16 EA |

Primary Examiner—Thomas A. Robinson
Attorney, Agent, or Firm—Robert O. Nimtz

[57] ABSTRACT

A detector circuit is shown for detecting off-hook and dial pulse signals in a telephone system which, under the control of a ringing relay, reconfigures itself to provide ring-trip detection. The detection circuit includes a bridge which is responsive to circulating loop currents, while at the same time unresponsive to longitudinally balanced currents, and a two-stage voltage level detector circuit. An RC timing circuit is included between the two stages to insure that the detector is unresponsive to short duration pulses and, at the same time, once energized, will bridge over short duration interruptions of detected pulses.

4 Claims, 3 Drawing Figures

FIG. I

LOOP CURRENT DETECTOR CONFIGURATION

RING-TRIP DETECTOR CONFIGURATION

DUAL MODE TELEPHONE SUBSCRIBER LOOP CURRENT DETECTOR

BACKGROUND OF THE INVENTION

1. Field of the Invention

This invention relates to signal detector circuits and, more particularly, to sensitive detectors for telephone loop signaling.

2. Description of the Prior Art

It is common practice to utilize sensitive relays to detect signaling currents in telephone subscriber loops. Thus, when a subscriber goes off-hook, the resulting current flow in the subscriber loop causes a line relay to operate and signal the central office of the off-hook condition. Similarly, loop interruptions caused by a rotary dial are detected in a dial pulse receiver, also including a sensitive relay responsive to interruptions in loop currents.

On the other hand, for subscribers who are being called rather than initiating a call, ringing signals are applied to the subscriber's loop to operate the telephone ringer. When the called subscriber goes off-hook, the resulting loop current flow is detected by a ring-trip relay to interrupt the ringing signals on the loop. This function, called "ring-trip," requires the detection of a low level dc loop current in the presence of a high level ac ringing signal.

Electronic loop current detectors, such as that shown in the copending application of S. J. Brolin and S. Colodner, Ser. No. 732,343, filed Oct. 14, 1976, and assigned to applicants' assignee, are known. Adequate discrimination against dial pulse splitting and adequate threshold stability remain problems, however.

In many subscriber loop carrier systems, such as those shown in J. L. Caldwell U.S. Pat. No. 3,963,869, granted June 15, 1976, and the copending application of T. N. Rao-R. Toumani Ser. No. 638,152, filed Dec. 5, 1975, telephone supervisory and loop closure signals cannot be transmitted directly through the carrier system. These signals must therefore be detected at the remote end of the carrier system and transmitted through the system to the central office terminal.

The usefulness of such carrier system is dependent, in part, on how far the subscriber loops can be extended from the remote end of the system. In order to extend such loops beyond the remote terminal for substantial distances, a sensitive and discriminating detector for off-hook, dial pulse and ring-trip currents is required. Moreover, the detector must provide accurate detection of these signals without significantly distorting the dial pulses.

SUMMARY OF THE INVENTION

In accordance with the illustrative embodiment of the present invention, off-hook, dial pulsing, and ring-trip signals are all detected by a common circuit. Under the control of ringing relay contacts, the circuit is configured as a loop current detector to detect off-hook and dial pulses in the absence of ringing signals. When the ringing relay contacts are operated, ringing is applied to the subscriber lines and the detection circuit is simultaneously reconfigured to provide a sensitive ring-trip detector.

The common portion of the ring-trip, off-hook, and dial pulse detector circuit has two stages. With the ringing relay released, the first stage detects metallic flow in the loop and its output faithfully follows all of the transitions in such loop current, including unwanted split dial pulses and noise pulse transitions. Inserted between the first and second stages of the detector is a timing circuit which, in combination with an automatically switched threshold in the second stage, insures that the operate and release transitions of the second stage cannot follow current transitions occurring at a substantially faster rate than standard dial pulse transitions. This rate is selected to block induced 60 Hz signals, noise pulses and to bridge over split dial pulses.

During ringing, circuit components are rearranged to provide a low-pass filter for the ringing signals, thus preventing these signals from interfering with the detection of direct current ring-trip signals.

DETAILED DESCRIPTION OF THE DRAWING

Figure 1:
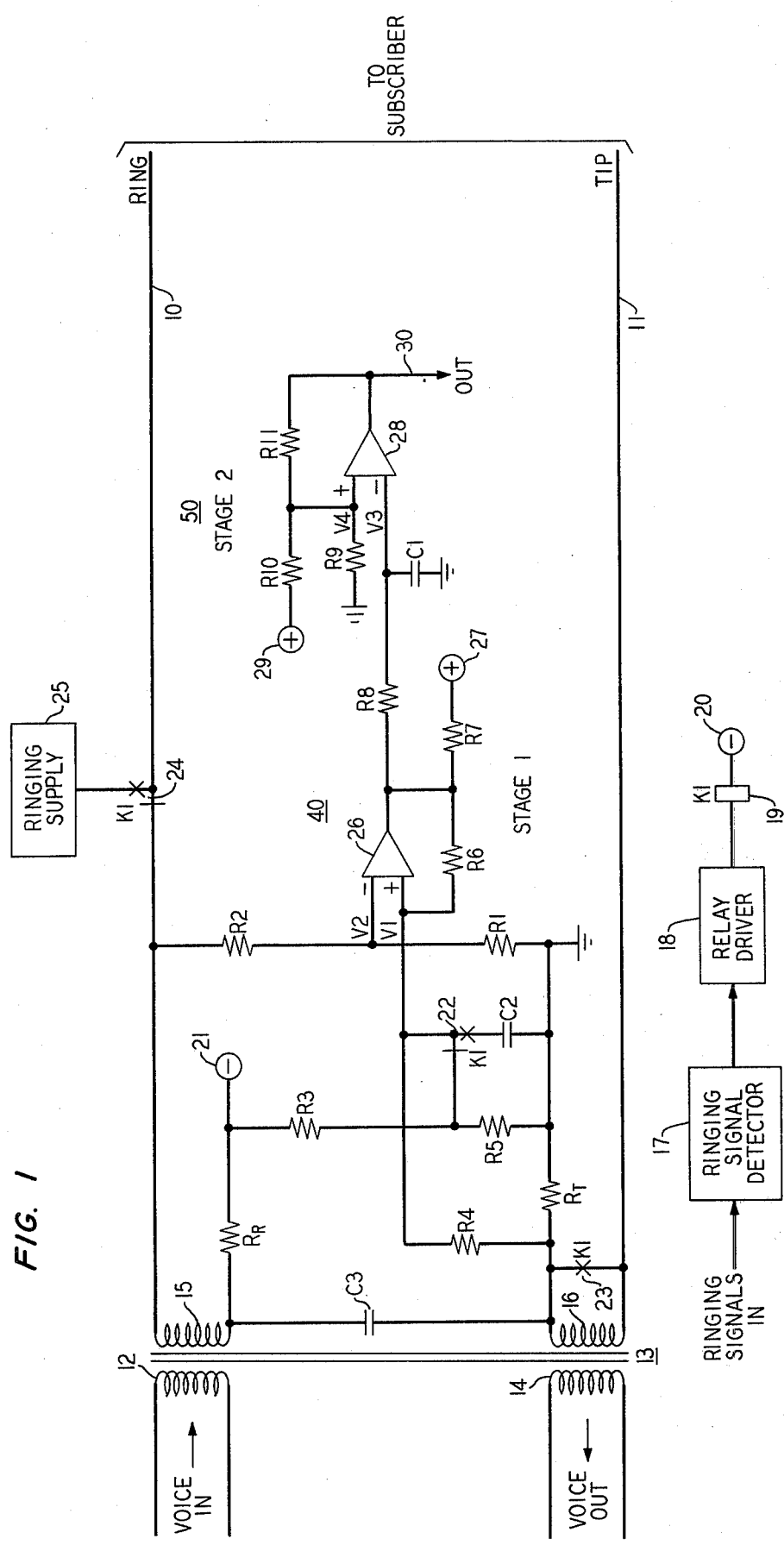
FIG. 1 shows a detailed circuit diagram of a loop closure and ring-trip detector in accordance with the present invention.

In FIG. 1 there is shown a detailed circuit diagram of a detector circuit which can be used both for detecting loop closure in a telephone circuit connected to ring conductor 10 and tip conductor 11 on calls initiated by the subscriber, and can also detect ring-trip signals for calls initiated at other subscribers and intended for the subscriber connected to conductors 10 and 11. The detector circuit of FIG. 1 is intended for use with telephone subscriber carrier system in which a portion of the loop between the subscriber and the central office includes a carrier system employing either frequency or time division multiplexing techniques. A time division multiplexing system of this type is shown in the aforementioned J. L. Caldwell patent while an analog carrier system is disclosed in the aforementioned copending application of T. N. Rao-R. Toumani. In either case, it is necessary to detect supervisory and signaling currents at or near the subscriber location and to translate these currents into a form suitable for transmission over the carrier facilities. Winding 12 of hybrid transformer 13 is the input port for voice signals derived from the carrier system. Similarly, winding 14 is the output port from hybrid transformer 13 to the carrier system. Windings 15 and 16 couple these voice signals to and from the subscriber connected to ring conductor 10 and tip conductor 11. The balance of the circuit of FIG. 1 comprises a detector circuit for currents flowing through the subscriber telephone set.

The carrier system also delivers a ringing signal indication to a ringing signaling detector 17 which, when energized, causes relay driver 18 to operate K1 relay 19 from voltage source 20. A suitable ringing signal encoder and decoder for this purpose is shown in the copending application of R. J. Canniff-M. T. Manfred, Ser. No. 659,369, filed Feb. 19, 1976.

The detector of FIG. 1 is a dual-mode detector which, in one mode, detects off-hook and dial pulsing signals from the subscriber station. In the other mode, the detector of FIG. 1 detects ring-trip currents which flow through the subscriber set when it is lifted off-hook in response to a ringing signal at the subscriber station. Contacts on K1 relay 19 reconfigure the detector of FIG. 1 between these two modes of operation.

The detector circuit comprises a capacitor C3 which completes the alternating current path to the subscriber set and permits direct current source 21 to provide talking current through resistor $R_R$, winding 15, ring conductor 10, the subscriber telephone set (not shown), tip conductor 11, winding 16, resistor $R_T$ to ground. The detector circuit also includes a bridge circuit including resistors R1, R2, R3, R4, and R5 connected in shunt with current detecting resistors $R_R$ and $R_T$. Under the control of K1 contacts 22, capacitor C2 can be substituted for resistors R3 and R5 in the circuit. K1 contacts 23 provide a short circuit across winding 16 and K1 contacts 24 transfer ring conductor 10 from winding 15 and the detector circuit to a ringing supply 25. K1 contacts 22, 23 and 24 are, of course, under the control of K1 relay 19.

Figure 2:
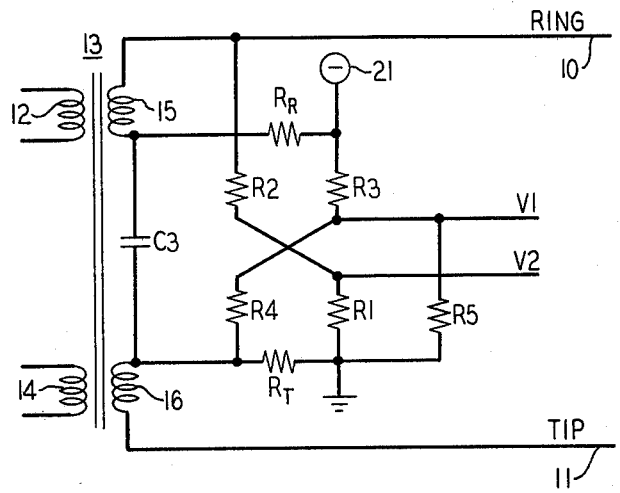
FIG. 2 is a simplified circuit diagram of the detector of FIG. 1 configured as a loop closure detector.

With K1 relay 19 unenergized, the normally open portions of K1 contacts 22 and 24 remain open and the resulting bridge circuit has the configuration shown in FIG. 2. In FIG. 2 the components of the circuit have been identified with the same reference numerals as are used in FIG. 1. It can be seen in FIG. 2 that this bridge circuit provides an output which is sensitive to metallic currents flowing circularly around the loop but is insensitive to longitudinal currents which flow in the same direction through both legs of the loop. That is, the voltage (V2-V1) is responsive to differential polarity voltage drops across resistors $R_R$ and $R_T$, but is insensitive to voltage drops of similar polarity across these two resistors. When voltage V2 rises above V1 due to this differential voltage drop, the balance of the detector responds to this voltage condition in a manner which will be described in connection with FIG. 1.

Returning then to FIG. 1, it is seen that the detector includes a first stage 40 including comparator 26 to which voltages V1 and V2 are applied. Resistor R6 provides feedback around comparator 26. Resistor R7 supplies voltage from source 27 through resistor R8 to charge capacitor C1. The voltage on capacitor C1 provides one input to a second comparator 28, the other input of which is supplied from the voltage divider comprising resistors R9 and R10 across voltage source 29. Comparator 28 also has a feedback resistor R11 connected between its output lead 30 and a positive input to comparator 28.

In the absence of metallic loop current on conductors 10 and 11, voltage V1 is greater than voltage V2 and the open collector output of comparator 26 is in its high (open circuit) state, thus permitting capacitor C1 to charge from source 27. When the subscriber lifts the handset from its cradle, thus going off-hook, a metallic loop current flows from source 21 through resistor $R_R$, winding 15, conductors 10 and 11, winding 16, and resistor $R_T$. This metallic loop current causes comparator 26 to operate, driving its output to a low (closed circuit) state and permitting capacitor C1 to discharge. After a preselected period of time, the charge on capacitor C1 decays sufficiently to trigger comparator 28 and thus provide a high (open circuit) output on lead 30.

Transitions in the metallic loop current do not occur instantly due to the inductance and capacitance of the subscriber's ringer. This tends to distort dial pulses and hence resistor R2, instead of being connected to the lower end of winding 15, is connected to the upper end. Changes in loop current develop a voltage transient across winding 15 which tends to compensate for the slow rise time of metallic loop current. Thus, by including winding 15 in the bridge circuit, the detector is able to follow, not only the level, but also the rate of change of metallic current and is therefore able to follow dial pulses with little or no transition distortion.

Under some conditions, it is possible for a current pulse to exist on conductors 10 and 11 which does not represent a valid off-hook or dial pulsing signal. These unwanted transients may, for example, arise due to conductor 10 or 11 being shorted to ground, due to the presence of induced 60 Hz signals on these conductors, to lightning, or to high level voice frequency signals on the line. Comparator 26 would tend to follow these unwanted transients and, by itself, produce false signaling conditions. An interstage timing circuit comprising resistors R7 and R8 and capacitor C1 and the second stage 50 cooperate to prevent these unwanted indications.

In particular, when comparator 26 detects an interruption in metallic loop current, the output from comparator 26 goes to a high (open circuit) state and capacitor C1 begins charging exponentially from 0 volts dc toward approximately +5 volts dc. The time constant of this charging circuit is selected to be approximately 13 milliseconds to accommodate standard 10 pulses per second dialing rates. After approximately 14 milliseconds, the voltage on capacitor C1 crosses the threshold voltage V4 (3.27 volts dc) and comparator 28 switches its output to a low condition. The feedback resistor R1 immediately reduces the threshold voltage V4 to +1.24 volts dc, which threshold must be crossed before comparator 28 will switch back to its high (open circuit) output condition.

While comparator 26 continues in the high output condition, capacitor C1 continues to charge, approaching +5 volts dc. A subsequent loop closure (dial pulse contacts closing) is detected by comparator 26, which switches its output to the low state. Capacitor C1 therefore begins discharging through resistor R8 and comparator 26 towards 0 volts dc with approximately a 10 millisecond time constant. In approximately 14 milliseconds, the voltage on capacitor C1 (V3) decreases to the +1.24 volt dc threshold voltage V4 and the output of comparator 28 switches to the high condition.

It can be seen that the second stage 50, including comparator 28, delays both the make and break dial pulse transitions equally by approximately 14 milliseconds. The second stage, however, alters neither the percent break nor the dial pulsing speed detected by the first stage.

When the first stage 40 detects an unwanted noise transition, that is, a transition which continues for less than approximately 10 milliseconds, capacitor C1 has not had sufficient time to completely charge and switch comparator 28 and hence such unwanted transitions do not appear at output lead 30. Similarly, the delay introduced by capacitor C1 and the hysteresis introduced by resistor R11 cooperate to prevent comparator 28 from following 60 Hz induced signals on the telephone loop.

It can be seen that the values of resistors R7 and R8 and capacitor C1, together with the change in the threshold of comparator 28, provide substantially equal charging and discharging times for capacitor C1 to enable and disable comparator 28. These equal times insure properly formed and properly timed dial pulses and yet permit a delay sufficient to discriminate against noise signals on the telephone loop. Comparators 26 and 28 may comprise standard open collector comparators such as those shown in the copending application of S. J. Brolin, Ser. No. 724,381, filed Sept. 17, 1976, and assigned to applicants' assignee.

Figure 3:
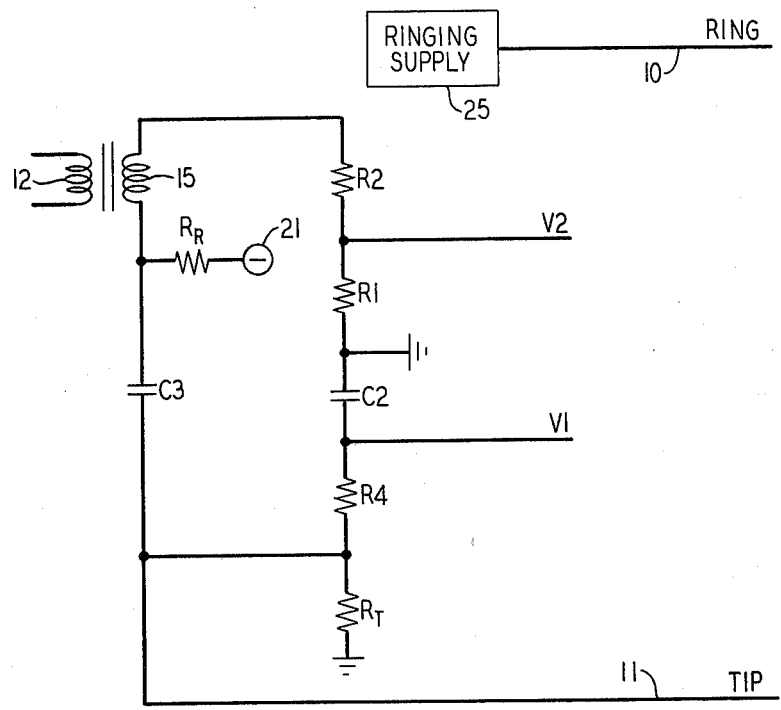
FIG. 3 is a simplified circuit diagram of the detector of FIG. 1 configured as a ring-trip detector.

When ringing signals are transmitted from the central office to the subscriber connected to conductors 10 and 11, ringing signal detector 17 detects these signals to operate K1 relay 19. A ringing detector for a digital carrier system is shown in the aforementioned copending application of r. J. Canniff-M. T. Manfred, assigned to applicants' assignee. When thus operated, K1 relay 19 connects ringing supply 25 to ring conductor 10 and reconfigures the detector circuit to detect ring-trip signals. In FIG. 3 there is shown a simplified circuit diagram of the ring-trip detector configuration which results. Again, in FIG. 3 the same reference numerals have been used to identify the same circuit components.

Turning then to FIG. 3, it can be seen that ring supply 25 is connected directly to ring conductor 10 and the ringing return path is provided by tip conductor 11 and resistor $R_T$ to ground potential. While the subscriber remains on-hook during ringing, resistor R4 and capacitor C2 form a low-pass filter for the ringing signals and the output voltage V1 remains high. A constant reference voltage is provided by a voltage divider including resistor $R_R$, winding 15, resistor R2, and resistor R1. This reference voltage provides input voltage V2 to comparator 26 in FIG. 1.

When the subscriber goes off-hook in response to the ringing signal, a direct current component flows in the ringing return current on tip conductor 11. The voltage drop across resistor $R_T$ from this direct current component causes voltage V1 to decrease and to eventually become more negative than reference voltage V2. As can be seen in FIG. 1, this cuases comparator 26 to operate and, after a 14 millisecond delay, comparator 28 to operate to provide an output signal on lead 30. This output signal on lead 30 is a ring-trip signal and is used to terminate the application of ringing signals to the subscriber loop.

It can be seen that the detector circuit of FIG. 1 operates both as a loop closure detector and as a ring-trip detector under the control of contacts on K1 relay 19. Moreover, when in the loop closure configuration, the detector of FIG. 1 detects dial pulses and discriminates against short noise pulses and 60 Hz signals on the telephone loop.

The arrangement of FIG. 1 has one further advantage. Under some circumstances dials may be "split," that is, brief interruptions in loop current may occur in the course of an otherwise proper dial pulse. Split pulses sometimes occur if many ringers are present on the loop, causing excessive transients in the dial pulse current, or if the loop is poorly balanced and exposed to a high level of longitudinal induction. The two-stage detector of FIG. 1 not only delays the detection of such dial pulses, but, due to the delay of the trailing edge of the dial pulses, serves to bridge over short interruptions in the dial pulses. Thus the dial pulse indications on output lead 30 do not track the interruptions in such split dial pulses and instead delivers a well-formed dial pulse for transmission back to the central office.

The sensitive detector of FIG. 1 enables the local drop from the detector to the location of the physical subscriber to be extended well beyond the normal range for other types of detectors. Indeed, the detector of FIG. 1 will detect off-hook, dial pulsing, and ring-trip signals on loops of up to 1800 ohms resistance, plus 200 ohm station set. This permits subscribers to be located at considerable distances from the remote terminal of a carrier system. This flexibility has many advantages, including the ability to serve widely scattered subscribers with a carrier system in a rural environment Moreover, this flexible service is obtained with improved dial pulse detection due to the ability of the detector circuit of FIG. 1 to ignore splits in dial pulses and to discriminate against short noise bursts which might otherwise be interpreted as dial pulses. Further, the use of the transformer primary winding 15 in the detection circuit speeds up "sluggish" transitions.

It is obvious that the principles embodied in the circuit of FIG. 1 can be applied to subscriber loops serving more than one party. In this case, of course, the ringing supply 25 must be arranged and interconnected to provide selective ringing signals superimposed on appropriate polarities of direct current voltage. Reconfiguring the circuit reduces the number of components required for ring-trip detection and thus reduces the cost and increases the reliability of the detector circuits.

What is claimed is:

1. A dual mode telephone loop current detector for detecting, in a first mode, dial pulse and off-hook loop currents in the absence of ringing signals and for detecting, in a second mode, off-hook loop currents in the presence of ringing signals, said dual mode detector comprising a detector input circuit including, in said first mode, a balanced bridge circuit, and including, in said second mode, a ringing signal bypass circuit, first and second stages of detection connected serially to said input circuit, each stage being responsive to signals exceeding a respective preselected threshold, delay means interconnecting said first and second stages and having a delay substantially less than the duration of said dial pulsed current, and switching means responsive to a ringing control signal for switching said input circuit from said first to said second mode.

2. The detector according to claim 1 wherein said bridge circuit includes an inductor for deriving a voltage proportional to the rate of change of currents in said loop to compensate for reactive delays associated with said loop.

3. The detector according to claim 1 wherein each said stage includes a voltage comparator; and means for adjusting the input voltage threshold of said comparator in response to the operation of said comparator.

4. The detector according to claim 1 wherein said switching mans comprises a relay and further including ringing detection means for operating said relay and for supplying ringing signals to said loop.

* * * * *